United States Patent
Buchholz et al.

(10) Patent No.: US 8,486,261 B2
(45) Date of Patent: Jul. 16, 2013

(54) FUEL SCAVENGE WATER REMOVAL SYSTEM

(75) Inventors: Joseph M. Buchholz, Minneapolis, MN (US); Matthew E. Leahy, Seattle, WA (US); Paul J. Maue, Monroe, WA (US); Edward M. Ducheane, Everett, WA (US); J. Everett Groat, Snohomish, WA (US); Arshad Nazir, Bellevue, WA (US); Michael L. Simmons, Everett, WA (US); Howard S. Veith, Mukilteo, WA (US); Peter K. Louden, Bellevue, WA (US); Kevin K. Longwell, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/113,945

(22) Filed: May 23, 2011

(65) Prior Publication Data

US 2012/0298593 A1 Nov. 29, 2012

(51) Int. Cl.
*B01D 35/02* (2006.01)
*B01D 17/038* (2006.01)

(52) U.S. Cl.
USPC .............. 210/171; 210/416.4; 210/512.1; 244/135 R; 123/25 A

(58) Field of Classification Search
USPC 210/416.4, 512.1, 171; 244/135 R; 123/25 A
See application file for complete search history.

(56) References Cited

U.S. PATENT DOCUMENTS

| | | | |
|---|---|---|---|
| 3,192,691 | A | 7/1965 | Ely |
| 3,242,473 | A | 3/1966 | Shivers, Jr. et al. |
| 3,298,522 | A | 1/1967 | Muller |
| 3,976,572 | A | 8/1976 | Reick |
| 4,257,890 | A | 3/1981 | Hurner |
| 4,334,989 | A | 6/1982 | Hall |
| 4,522,712 | A | 6/1985 | Fischer et al. |
| 4,795,556 | A | 1/1989 | Brotea et al. |
| 5,143,608 | A | 9/1992 | Marshall, Sr. |
| 5,783,078 | A | 7/1998 | Roll et al. |
| 5,993,675 | A | 11/1999 | Hagerthy |
| 2010/0006048 | A1 * | 1/2010 | Minty et al. ............... 123/25 A |

FOREIGN PATENT DOCUMENTS

| | | |
|---|---|---|
| GB | 2471868 A | 1/2011 |
| WO | 0047305 A1 | 8/2000 |
| WO | 2008110837 A1 | 9/2008 |
| WO | WO 2010103305 A2 * | 9/2010 |

* cited by examiner

*Primary Examiner* — David A Reifsnyder
(74) *Attorney, Agent, or Firm* — Felix L. Fischer

(57) ABSTRACT

An aircraft fuel scavenge system incorporates a scavenge pump receiving fuel from a center tank and depositing the fuel in a wing tank. A water separator receives fuel through an inlet tube providing a plurality of momentum changes to incoming fuel, the water separator having a fuel outlet connected to the scavenge pump and a water outlet. A water manifold is connected from the water outlet to an input to a fuel supply line to an engine.

14 Claims, 8 Drawing Sheets

# FUEL SCAVENGE WATER REMOVAL SYSTEM

BACKGROUND INFORMATION

1. Field

Embodiments of the disclosure relate generally to the field of aircraft fuel systems and more particularly to embodiments for a fuel scavenge water removal system employing flow direction change and fluid velocity reduction.

2. Background

Large commercial aircraft often employ a center fuel tank and separate wing tanks. Weight and balance requirements as well as fuel usage by the engines or other operational considerations may require fuel from the center tank to be burned prior to fuel in the wing tanks. Since the center tank fuel pumps are not able to completely drain the center, a separate fuel scavenge system is installed to transfer the small amount of fuel remaining to the wing tanks. The temperatures outboard from the fuselage are much colder than the temperatures inboard which may cause any water present in fact being moved outboard into the wing, tanks to freeze and impair fuel transfer.

It is therefore desirable to provide a fuel scavenge water removal system which prevents water from leaving the warmer center tank.

SUMMARY

Embodiments described herein provide an aircraft fact scavenge system incorporating a scavenge pump receiving fuel from a center tank and depositing the fuel in a wing tank. A water separator receives fuel through an inlet tube providing a plurality of momentum changes to incoming fuel, the water separator having a fuel outlet connected to the scavenge pump and a water outlet. A water manifold is connected from the water outlet to an input to a fuel supply line to an engine.

The water separator in an example embodiment includes a canister having an inlet attached to an inlet tube to receive fuel. The inlet tube has a plurality of bends imparting momentum change to the fuel. A dispensing tube is connected from the inlet to expel fuel into a chamber in the canister. The fuel outlet from the canister connects to an inboard manifold for providing fuel to the scavenge pump and the water outlet from the canister connects to the water manifold for entraining water into fuel feed for an engine.

In operation the scavenge pump is activated for pumping of fuel from a center fuel tank to a wing fuel tank. Fuel drawn from the center fuel tank flows through the inlet tube with induced momentum changes and into the water separator. Additional momentum change is induced with a curved fuel dispensing line internal to the water separator. Fuel is then ejected substantially tangential to an inner wall of the canister. A final momentum change in induced by a vertical baffle stopping circumferential motion of the fuel. Separated water is accumulated in a lower region of the chamber and is extracted through the dip tube and water manifold. The water is then entrained into fuel flowing into an engine.

The features, functions, and advantages that have been discussed can be achieved independently in various embodiments of the present invention or may be combined in yet other embodiments further details of which can be seen with reference to the following description and drawings.

DETAILED DESCRIPTION

Figure 1A:
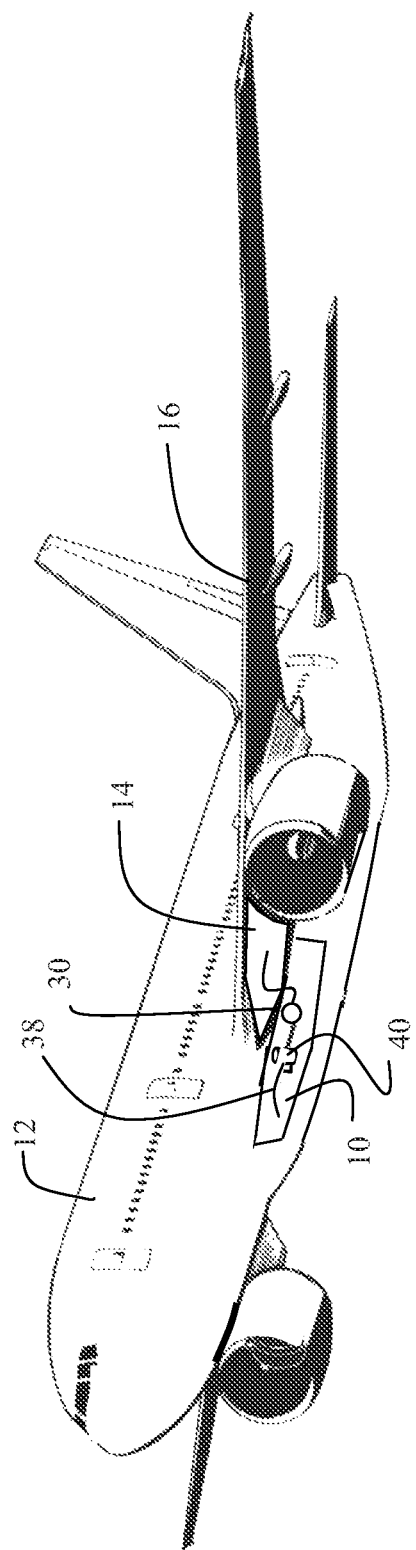
FIG. 1A is a pictorial representation of an aircraft incorporating a fuel system with embodiments disclosed herein
Figure 1B:
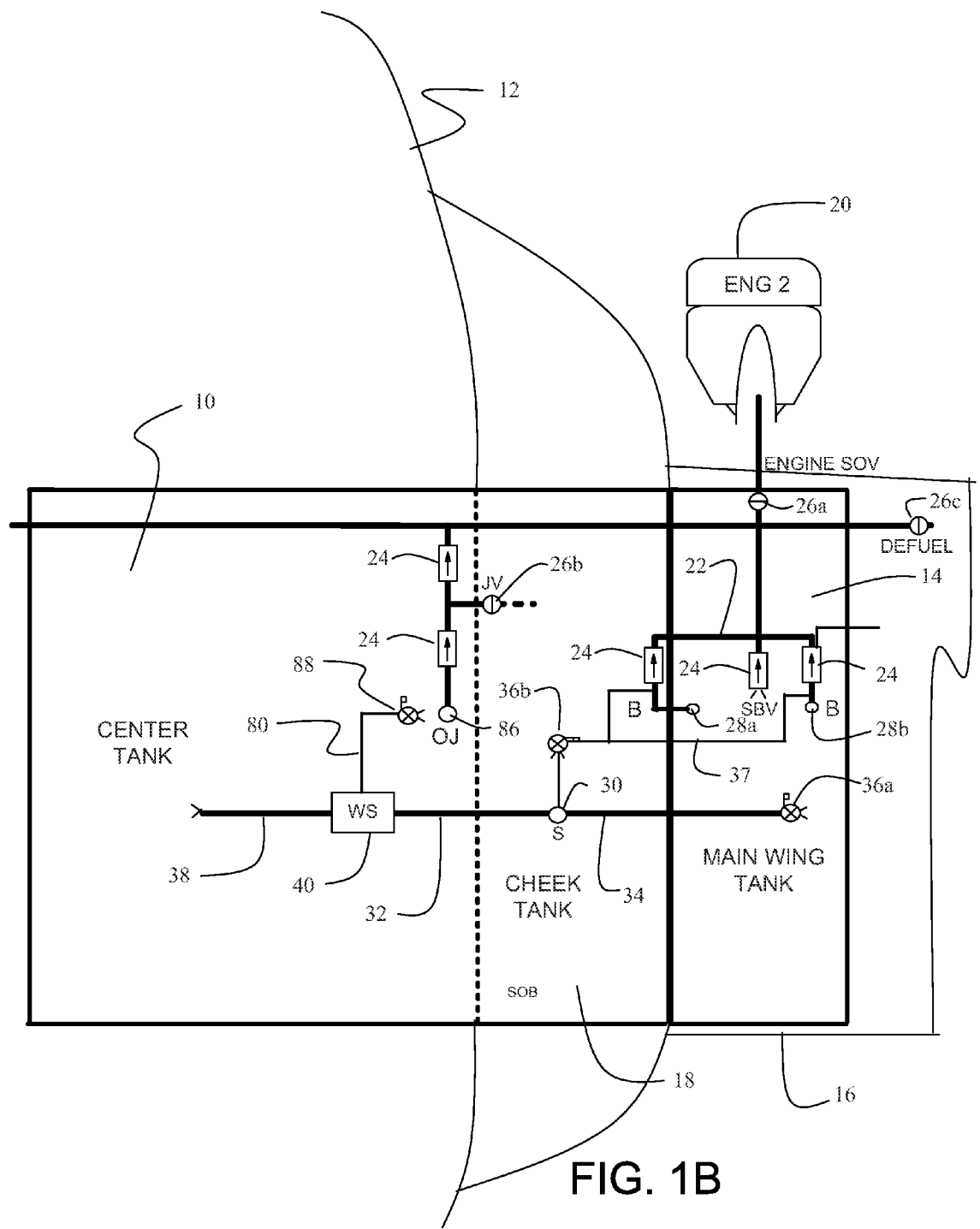
FIG. 1B is a schematic diagram of details of the example commercial aircraft fuel system showing a center tank and one wing tank with associated plumbing and components including an embodiment of the fuel scavenge water removal system.

The embodiments described herein demonstrate a system for use in a large aircraft fuel system as shown in FIGS. 1A and 1B. A center fuel tank 10 is located in the aircraft fuselage 12. A wing fuel tank 14 in the aircraft wing 16 is located outboard from the center fuel tank 10. Details of an example wing with associated fuel tankage is shown schematically in FIG. 1B which is typically symmetrically mirrored in a opposite wing on the aircraft. For the embodiment shown, an interconnected cheek tank 18 is located outboard of the main center fuel tank 10. A representative engine 20 receives fuel from the aircraft fuel system including the center fuel tank 10, wing fuel tank 14 and cheek tank 18 through engine fuel feed manifold 22 which includes check valves 24 to maintain proper fact flow direction from the fuel tanks and various valves including engine shutoff valve 26a, jettison valve 26b and defuel valve 26c. Boost pumps 28a and 28b provide pressure assistance for fuel flow to the engine 20. Fuel from the center tank is delivered to the engine with the Override/Jettison (OJ) Pump 86.

Figure 2:
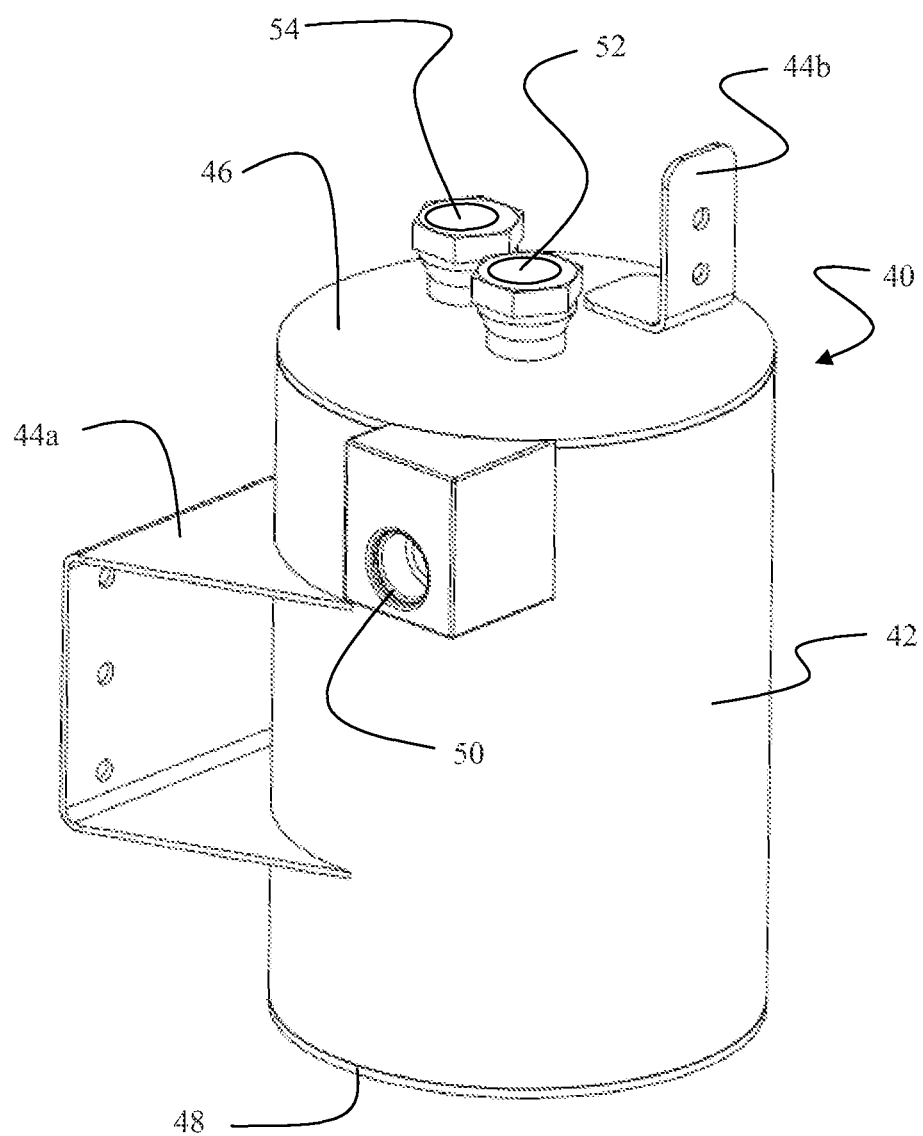
FIG. 2 is an isometric side view of an embodiment of the fuel scavenge water separator.
Figure 3A:
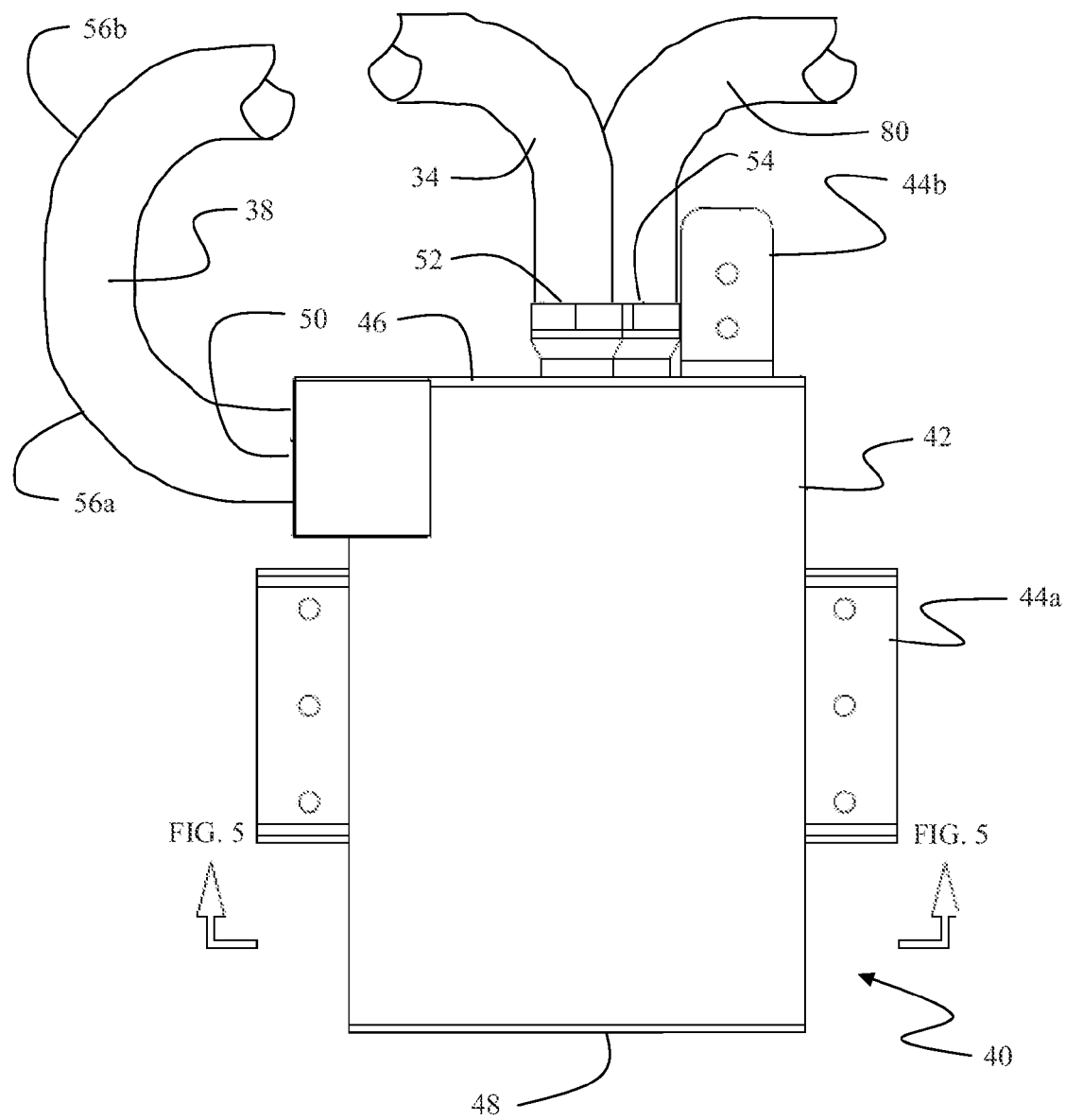
FIGS. 3A and 3B are side and front views of the water separator.
Figure 3B:
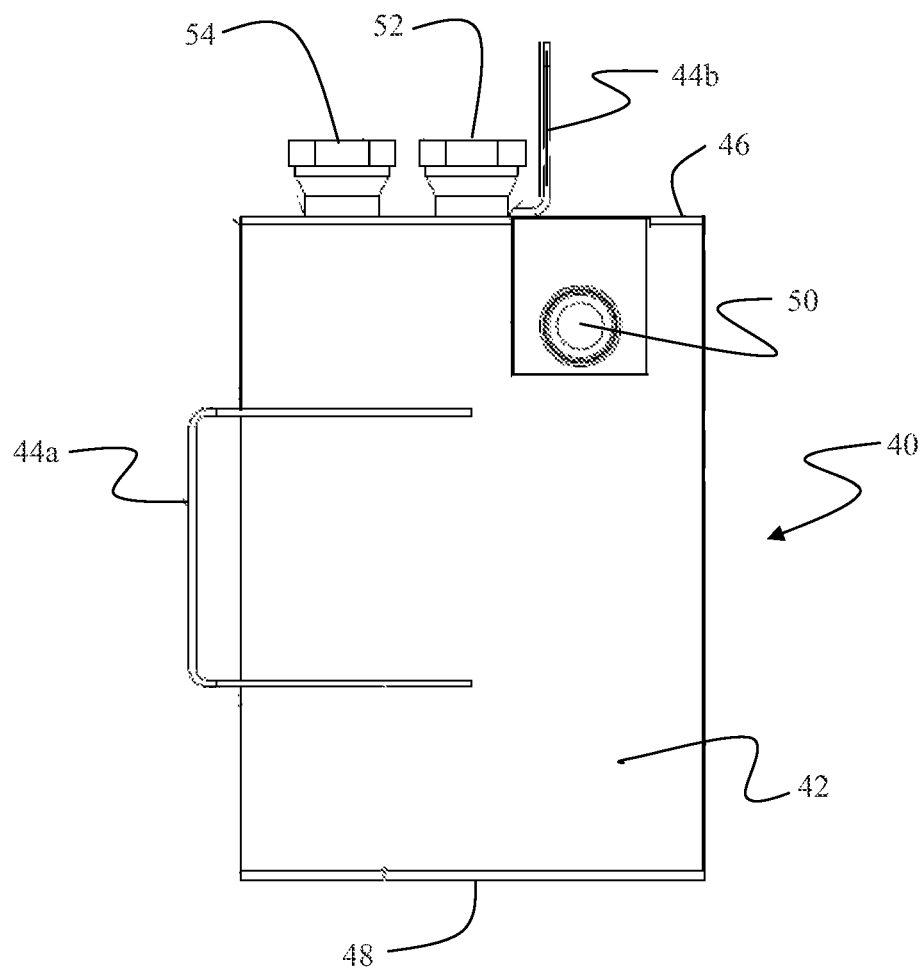

A fuel scavenge system is incorporated to move fuel from the center fuel tank 10 to the wing fuel tank 14. A scavenge pump 30 pumps fuel through an inboard manifold 32 originating in the center fuel tank 10 to an outboard manifold 34 emptying into the wing fuel tank 14. For the embodiment shown, the scavenge pump 30 is a passive venturi pump relying on pressure differential created through motive flow from pump manifold 37 connected to the boost pumps 28a and 28b. For the embodiment shown, the scavenge pump 30 is operated responsive to a first float operated shutoff valve 36a sensing fuel level in the wing fuel tank 14 and a second float operated shutoff valve 36b sensing fuel level in the center tank. Valve 36a prevents fuel from being scavenged to the wing fuel tank 14 until enough fuel has been consumed from the wing fuel tank 14 to make sure there is enough room for the scavenged fuel without over filling the wing fuel tank 14. Valve 36b senses the fuel level in the center fuel tank 10 and prevents motive flow from the boost pumps [28a, 28b] from being sent to the scavenge pump 30 until the center fuel tank 10 is nearly empty. Inserted in the inboard manifold 32 between an inlet tube 38 from the center fuel tank 10 and the scavenge pump 30 is a water separator 40 (represented also in FIG. 1A (not to scale)). As shown in FIGS. 2, 3A and 3B, the water separator 40 incorporates a substantially cylindrical canister 42 having mounting brackets 44a and 44b to secure the separator to appropriate aircraft structure. A top cover 46 and bottom cover 48 seal the canister 42. Inlet tube 38 (shown in FIGS. 1A, 1B and FIG. 3A) is received at an inlet 50 near the top of the canister. A fuel outlet 52 is centrally located in the top cover for continuing fuel flow into the inboard manifold 32 to the scavenge pump 30. A water outlet 54 is also provided in the top cover 46. Inlet tube 38 incorporates two 90° vertical bends 56a and 56b (best seen in FIG. 3A) the function of which will be described in greater detail subsequently.

Figure 4:
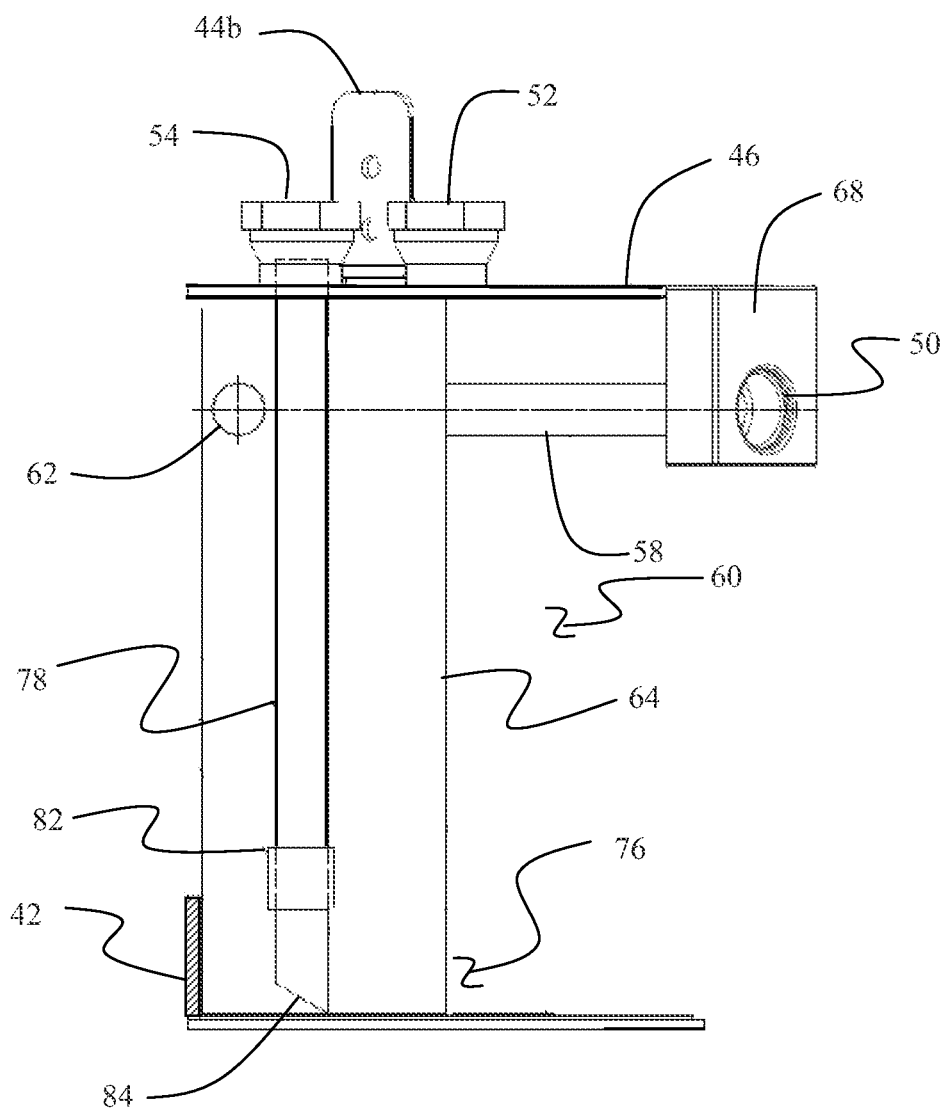
FIG. 4 is an oblique side section view of the water separator showing the internal components.
Figure 5:
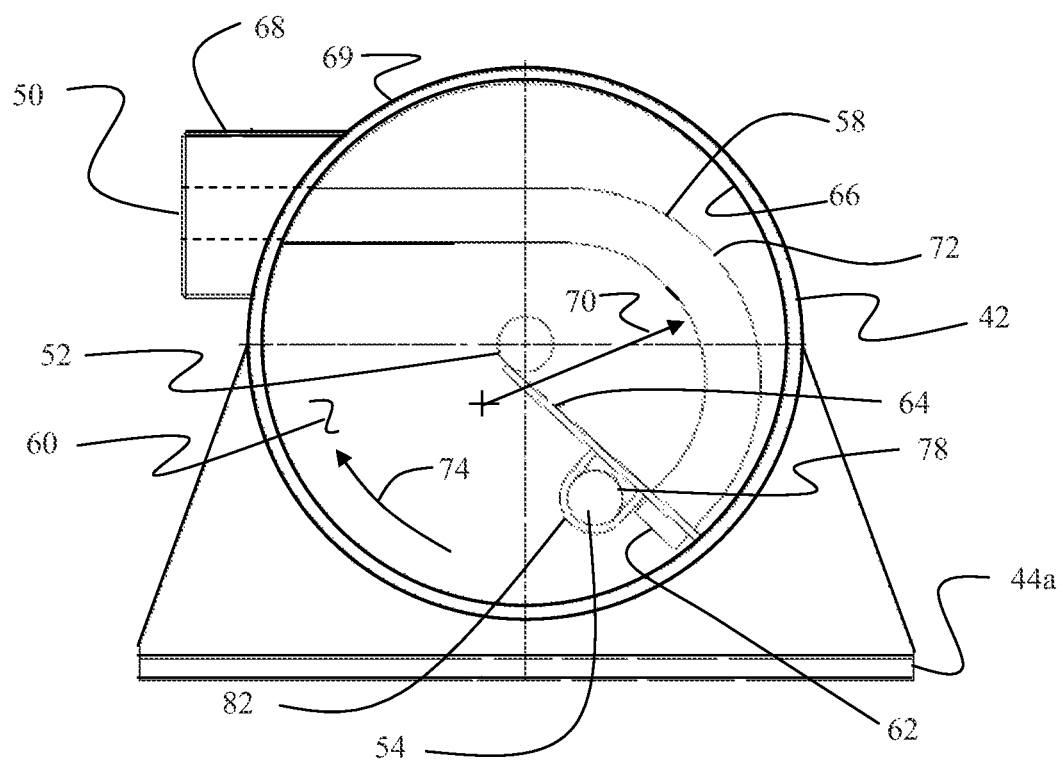
FIG. 5 is a bottom section view showing the internal components of the water separator.

The internal configuration of water separator 40 is shown in FIGS. 4 and 5. A fuel dispensing line 58 extends from the inlet 50 into chamber 60 within the canister 42. The dispensing line 58 curves horizontally with an exit 62 extending through a vertical baffle 64 that is mounted between the top and bottom of the canister adjoining the inner wall. The curve in the dispensing line is greater than 90° and for the embodiment shown is approximately 120°. Shaping of the dispensing line 58 results in further momentum change and expulsion of the incoming fuel into the chamber 60 substantially tangential to an inner wall 66 of canister 42. For the embodiment shown, inlet 50 is housed in a boss 68 extending from an external wall 69 of the canister 42 which provides rigid structural support for inlet tube 38 and dispensing line 58. Boss 68 is located offset in the canister wall at a position to provide sufficient clearance for a desired radius 70 for horizontal curve 72 in the dispensing line.

Fuel, with water contamination, flowing from the center fuel tank 10 in the inlet tube 38 is subjected to series of momentum changes flowing through the vertical 90° bends 56a and 56b and horizontal curve 72 and ejected from the exit 62 of the dispensing line 58 to flow substantially tangentially decelerating around the canister inner wall 66 as represented by arrow 74 in FIG. 5. Vertical baffle 64 provides a final momentum change substantially stopping circumferential motion of the fuel in the canister. The multiple momentum changes and deceleration of the fuel in the canister causes separation of the heavier water which descends to a bottom region 76 in the chamber 60 of canister 42.

As shown in FIG. 4, a dip tube 78 extends into the canister 42 through top 46 which is connected through water outlet 54 for removal of water from bottom region 76 in the canister chamber. A water manifold 80, shown in FIG. 3A, carries water from the water outlet 54. For the embodiment shown, the dip tube is mounted to the vertical baffle 64 with support clip 82 and has a beveled inlet 84.

Returning to FIG. 1, water manifold 80 discharges next to the inlets of override jettison (OJ) pump 86 where it is mixed into the fuel prior to being transported to fuel feed manifold 22, for the embodiment shown. Water collected in the water separator 40 is provided in fuel flow to the engine for combustion and is exhausted through the engine. A float controlled valve 88 is employed in the water manifold to control flow. The float valve 88 does not open until the center tank is completely drained. Once the tank is empty the valve opens and the water drains next to the inlet of the OJ pump 86. The water is mixed with fuel and consumed on the next flight. Once the float valve 88 opens it allows air to flow into the water separator and the scavenge pump is prevented from transferring any more fuel.

In an example embodiment the water separator canister 42 is a cylinder approximately 5 inches in diameter and 7 inches in height. The inlet tube 38, inboard manifold 32, water manifold 80 and dip tube 78 are all ½ inch diameter lines. Bend radii for the momentum change bends are nominally two times line diameter or approximately 1 inch for the embodiment shown. Canister sizing for the example embodiment provides the capability to hold at least 1 litre of water. This value was determined by inspections of in service aircraft. While canister 42 is shown as a cylindrical cross section, conical cross section elements may be employed in alternative embodiments.

Figure 6:
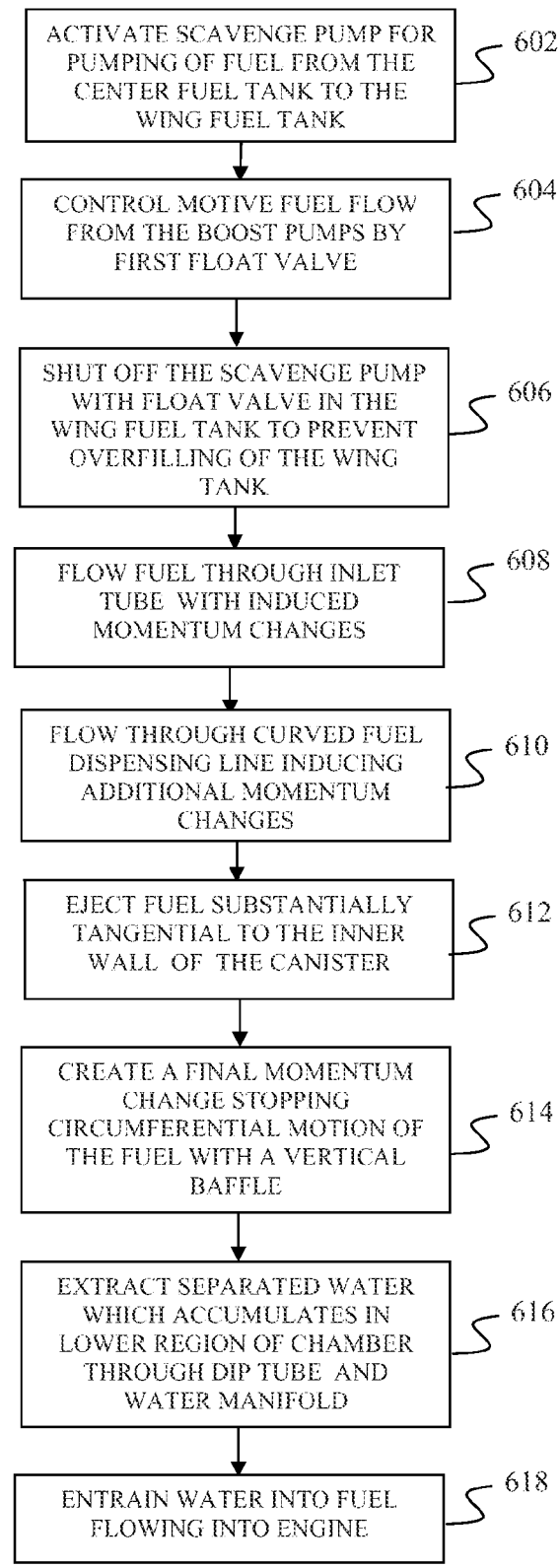
FIG. 6 is a flow chart of fuel scavenge water removal opera on of the embodiments described herein.

Operation of the fuel scavenge system with water separation is shown in FIG. 6. Scavenge pump 30 is activated, step 602, for pumping of fuel from the center fuel tank 10 to the wing fuel tank 14. For an example embodiment, the scavenge pump is a passive venturi pump which is activated by motive fuel flow from the boost pumps 28a, 28b and controlled by first float valve 36b, step 604. Float valve 36a in the wing fuel tank shuts off the pump to prevent overfilling of the wing tank, step 606, if required. Fuel drawn from the center fuel tank by scavenge pump 30 flows through inlet tube 38 with induced momentum changes, step 608, and into water separator 40 with curved fuel dispensing line 58 inducing additional momentum changes, step 610. Fuel is then ejected substantially tangential to the inner wall 66 of canister 42, step 612. A final momentum change is created, step 614, by vertical baffle 64 stopping circumferential motion of the fuel. Separated water which accumulates in lower region 76 of chamber 60 is then extracted through dip tube 78 and water manifold 80, step 616, and entrained into fuel flowing into engine 20, step 618. For the embodiment shown, extraction and entrainment are accomplished using the override jettison pump 86 with flow control by float valve 88.

A single water separator is shown for the embodiment described. However, in alternative embodiments, multiple water separators may be employed with one or more scavenge systems.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. An aircraft fuel scavenge system comprising:
   a scavenge pump receiving fuel from a center tank and depositing the fuel in a wing tank;
   a water separator intermediate the center fuel tank and scavenge pump receiving fuel containing water through an inlet tube and incorporating
      a canister having an inlet attached to the inlet tube to receive fuel, said inlet tube having a plurality of bends imparting a plurality of momentum changes to the incoming fuel;
      a dispensing tube connected from the inlet and expelling fuel into a chamber in the canister;
      and wherein the fuel outlet is located in a top of the canister and connects to an inboard manifold for providing fuel to the scavenge pump; and,
      a water outlet is located in a top of the canister; and,
   a water manifold connected from the water outlet to an input to a fuel supply line to an engine.

2. The aircraft fuel scavenge system defined in claim 1 wherein the canister is substantially cylindrical and includes an inner wall defining the chamber.

3. The aircraft fuel scavenge system as defined in claim 2 wherein the dispensing tube incorporates a horizontal bend of greater than 90° with an exit expelling fuel substantially tangential to the inner wall.

4. The aircraft fuel scavenge system as defined in claim 3 further comprising a vertical baffle through which the dispensing tube extends near the exit.

5. The aircraft fuel scavenge system as defined in claim 1 wherein the inlet tube incorporates two vertical 90° bends prior to the inlet to the canister and said inlet is housed in a boss on an exterior wall of the canister.

6. The aircraft fuel scavenge system as defined in claim 1 wherein the water outlet includes a dip tube depending from a top of the canister into a lower region of the chamber for water collection.

7. The aircraft fuel scavenge system as defined in claim 6 wherein the dip tube is attached to a vertical baffle.

8. The aircraft fuel scavenge system as defined in claim 6 wherein the dip tube has a beveled inlet.

9. water separator for an aircraft fuel scavenge system comprising:
   a canister having an inlet attached to an inlet tube to receive fuel containing water, said inlet tube having two vertical 90° bends prior to the inlet to the canister;
   a dispensing tube connected from the inlet and incorporating a horizontal bend of greater than 90° with an exit expelling fuel substantially tangential to an inner wall of a chamber in the canister, said vertical 90° bends and said horizontal bend imparting momentum change to the fuel;
   a fuel outlet from the canister connecting to an inboard manifold for providing fuel to a scavenge pump; and,
   a water outlet from the canister connecting to a water manifold for entraining water into fuel feed for an engine.

10. The water separator defined in claim 9 wherein the canister is substantially cylindrical.

11. The water separator as defined in claim 10 further comprising a vertical baffle through which the dispensing tube extends near the exit.

12. The water separator as defined in claim 9 wherein said inlet housed in a boss on an exterior wall of the canister and said fuel outlet is located centrally on a top of the canister.

13. The water separator as defined in claim 9 wherein the water outlet includes a dip tube depending from a top of the canister into a lower region of the chamber for water collection.

14. The water separator as defined in claim 13 wherein the dip tube is attached to a vertical baffle.

\* \* \* \* \*